Figure 1:
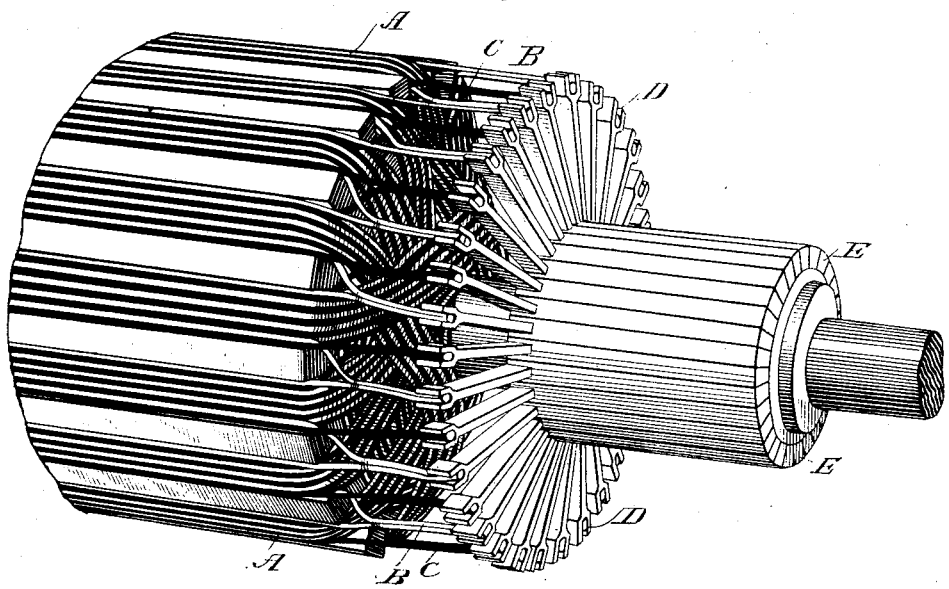

(No Model.) 2 Sheets—Sheet 1.

E. WESTON.
DYNAMO ELECTRIC MACHINE.

No. 255,364. Patented Mar. 21, 1882.

Attest:
R. F. Barnes.
N. Finsty.

Inventor:
Edward Weston
per Parker W. Page,
Atty.

(No Model.) 2 Sheets—Sheet 2.

E. WESTON.
DYNAMO ELECTRIC MACHINE.

No. 255,364. Patented Mar. 21, 1882.

Attest: Inventor:
R. F. Barnes. Edward Weston
H. Frisby per Parker W. Page
 Atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DYNAMO-ELECTRIC MACHINE.

SPECIFICATION forming part of Letters Patent No. 255,364, dated March 21, 1882.

Application filed October 17, 1881. (No model.)

*To all whom it may concern:*

Be it known that I, EDWARD WESTON, of Newark, in the county of Essex and State of New Jersey, have invented certain new and useful Improvements in Dynamo-Electric Machines, of which the following is a specification, reference being had to the drawings accompanying and forming a part thereof.

My invention relates to that class of electrical generators which have an armature containing a system of coils formed by winding a continuous insulated conductor in sections thereon, so that the convolutions may pass through the magnetic field at right angles to the lines of force, and connected to the segments of the commutator by loops formed by those portions of the conductor which join the sections or coils. Such machines, together with the methods of winding the same and forming the commutator-connections, are described in former patents granted to me, no ticeably my patent numbered 209,532. Great difficulty is experienced in these machines in avoiding "short-circuiting" of the adjacent commutator-strips and the consequent destruction of the insulation of the coils included in the circuit between the adjacent segments. This arises, notwithstanding the fact that all the strips on one side of a line bisecting the commutator diametrically are of opposite polarity only to those on the other side, for there is a difference of potential between any two adjacent strips on either side of this line, and a consequent tendency for a current to pass from one strip to the adjacent strip, having a lower potential, thus forming a branch or derived circuit through which a portion of the current will flow that should pass to the main circuit. The liability of thus short-circuiting and injuring by the effects of heat the coils included in the circuit between any two given adjacent commutator-segments, is reduced by increasing the number of sections of wire on the armature, and correspondingly increasing the number of commutator-segments in this way it is possible to so far increase the number of sections as to avoid the flow of a current of such strength as to heat any section to a degree sufficient to destroy the insulating material. This is, however, in practice both expensive and troublesome, and does not obviate the loss of useful effect which arises from cutting out that portion of the otherwise effective wire which is included between the two adjacent strips, which have been short-circuited.

My invention is directed to overcoming these difficulties, and is designed to render the machines constructed substantially as above described more reliable, efficient, and easier of management.

To this end it consists in winding the armature with two or more independent endless wires, and so connecting them by loops to the commutator-segments as to avoid having any two adjacent strips of the commutator connected to loops from adjacent coils on the armature. In practice two wires for the armature will generally be found sufficient to avoid short-circuiting the coils. In this case the armature may be wound in sections, as customary heretofore; but in connecting them together it is necessary to connect alternate sections, instead of adjacent sections, and to lead the loops or ends so formed to alternate strips of the commutator. When this is done with the first series of alternate coils the second or intermediate series may be connected in the same manner to the remaining commutator-segments.

In the accompanying drawings I have illustrated the manner in which my invention is or may be carried into effect.

Figure 2:
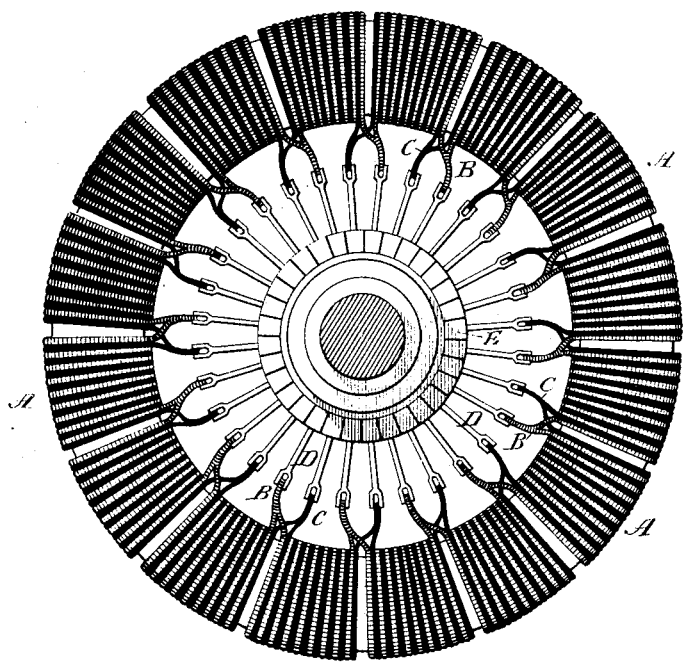
Figure 3:
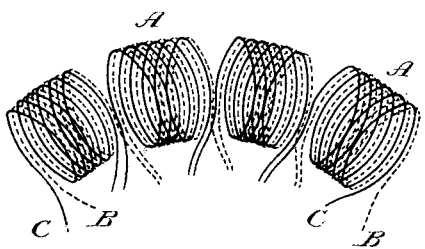

Figure 1 represents the end of a cylindrical armature, with its commutator attached, showing the method of winding and connections as above proposed. Fig. 2 is an end view of a circular or ring armature, to the winding of which my invention is shown applied. Fig. 3 is a diagrammatic illustration of the winding in detail.

Similar letters of reference designate corresponding parts in all the figures.

It is well known that the cylindrical and ring armatures as at present employed are wound with a number of independent coils or bobbins. In former patents granted to me I have described an armature in which these coils are connected end to end to form a single continuous wire, the connections in this case being made by the loops or joined ends passing to the commutator-segments. The drawings hereto annexed illustrate armatures answering substantially to this description.

The letters A represent, referring for the present to Fig. 1, the sections formed in or on a cylindrical armature. In the sections are wound the coils represented by the white and shaded wires, the direction of winding and method of taking off the loop being similar to that described in the above-mentioned patent, No. 209,532. These loops are represented respectively by the letters B and C.

E E are the commutator-segments; D, upright arms connected therewith and arranged to receive at their ends the loops or ends taken from the armature-coils. As shown by the drawings, the dark loops are connected with alternate uprights and commutator-segments, while the light loops are connected in similar manner to the intervening segments. From this it will be seen that the brushes, as they slide from one pair of segments of the commutators, will come on another pair of segments with which there is no tendency to short-circuit. The same results are obtained in the case of a ring-armature, as shown in the remaining figures. A A in these represent the several sections or bobbins, B and C, the loops or ends taken from the wires where they are brought over from one coil to the next to form two continuous conductors. It will be observed in this case, as in the former, that the dark wires, forming the loops from one conductor, are connected to alternate strips, while the white wires, forming the loops from the other conductor, are attached to the intervening segments. This is also illustrated in Fig. 3, where the conductors are indicated, the one by an unbroken, the other by a dotted, line, C B being the points of attachment to the commutator. It will thus be seen that by this mode of winding and connecting the coils to the commutator strips or segments, should any two adjacent strips of the commutator be accidentally connected together— as by particles of metal from the brushes bridging the space between the separate strips—no injury can result to the machine, nor is there any loss of useful effect. In fact it now becomes necessary to connect the alternate strips in order to short-circuit any section of the coils on the armature. This can only occur in practice by connecting or bridging over two of the insulating-spaces, and so connecting three of the commutator-strips. It is also evident that winding an increased number of coils will still further reduce the liability to injury or loss of energy.

I have now described my invention as embodied in its most practical and effective form of which I am at present aware.

As above stated, the method of winding shown may be varied by winding each coil in independent sections in the several recesses or grooves instead of having the wires side by side throughout their whole length, as shown in the drawings. In either case, however, the result is the same; and so therefore, without restricting myself to any precise form of armature or machine of the above-described type to which the same is or may be applied.

What I claim as new, and desire to secure by Letters Patent, is—

1. In a magneto or dynamo electric machine, an armature containing two or more systems of independent conductors wound in sections thereon, so as to pass through the magnetic field at right angles to the lines of force, as described, in combination with a commutator to alternate segments of which adjacent sections of the armature-conductors are connected, substantially in the manner set forth.

2. In a magneto or dynamo electric machine, a cylindrical or annular armature wound with two or more systems of independent continuous conductors the adjacent sections of which are connected to alternate segments of the commutator, substantially as set forth.

3. In a magneto or dynamo electric machine, the combination of a cylindrical or annular armature having grooves or recesses for the reception of the coils or bobbins, two or more independent continuous conductors wound therein, substantially in the manner described, and a commutator to the segments of which the said coils or bobbins are alternately connected, substantially as and for the purpose set forth.

In testimony whereof I have hereunto set my hand this 14th day of October, 1881.

EDWARD WESTON.

Witnesses:
R. F. BARNES,
W. FRISBY.